United States Patent
Yoshimura et al.

(10) Patent No.: US 7,009,031 B2
(45) Date of Patent: Mar. 7, 2006

(54) COMPOSITION FOR OPTICAL MATERIAL

(75) Inventors: Yuichi Yoshimura, Mie (JP);
Motoharu Takeuchi, Tokyo (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 10 days.

(21) Appl. No.: 10/380,251

(22) PCT Filed: Sep. 4, 2001

(86) PCT No.: PCT/JP01/07647

§ 371 (c)(1),
(2), (4) Date: Mar. 13, 2003

(87) PCT Pub. No.: WO02/23230

PCT Pub. Date: Mar. 21, 2002

(65) Prior Publication Data

US 2004/0024165 A1    Feb. 5, 2004

(30) Foreign Application Priority Data

Sep. 14, 2000 (JP) .............. 2000-279176

(51) Int. Cl.
 C08G 75/00 (2006.01)
 C08F 283/00 (2006.01)
 C08L 81/00 (2006.01)

(52) U.S. Cl. ............ 528/373; 528/377; 528/403; 525/328.5; 525/535

(58) Field of Classification Search ......... 528/373, 528/377, 403; 525/328.5, 535
See application file for complete search history.

(56) References Cited

FOREIGN PATENT DOCUMENTS

| EP | 0 896 972 | 2/1999 |
|---|---|---|
| EP | 0 987 567 | 3/2000 |
| EP | 1 006 374 | 6/2000 |

OTHER PUBLICATIONS

Levesque et al.; Dithioacetic acid trimers, Lab. Phys.-Chim., Univ. Maine, Le Mans, Fr, Tetrahedron Letters (40), Chem Abstract 90: 152138.*
Engler et al.; Chalcogenolates; Univ. Mainz, Mainz, Germany, Chem Abstract 77: 75182.*
Shell Internationale Research; Heterocyclic polymercaptans; Chem Abstract 62: 91040.*

* cited by examiner

*Primary Examiner*—Duc Truong
(74) *Attorney, Agent, or Firm*—Antonelli, Terry, Stout and Kraus, LLP

(57) ABSTRACT

The composition for optical materials of the present invention contains at least one compound represented by the following Formula 1:

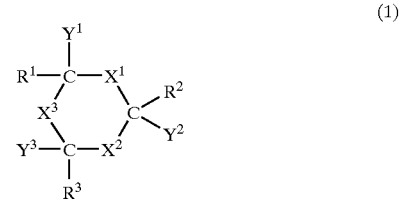

(1)

wherein $R^1$, $R^2$ and $R^3$ are each independently $C_1$–$C_{10}$ hydrocarbyl or hydrogen; $X^1$, $X^2$ and $X^3$ are each independently S, Se or Te; $Y^1$, $Y^2$ and $Y^3$ are each independently $-S_a-[(CH_2)_bS]_cH$, a is an integer from 0 to 2, b is an integer from 0 to 4, and c is an integer from 0 to 2, and a compound reactive to the compound of Formula 1. A resin produced by curing a composition containing the compound of Formula 1 by polymerization has a high refractive index, and suitable as various optical materials.

15 Claims, No Drawings

COMPOSITION FOR OPTICAL MATERIAL

TECHNICAL FIELD

The present invention relates to a composition for optical materials suitable for producing an optical material such as plastic lens, prism, optical fiber, information recording medium, and filter, particularly, for producing a plastic spectacle lens.

BACKGROUND ART

Plastic materials have been widely used in various optical applications, particularly in manufacturing spectacle lenses, because of their light weight, toughness and easiness of dyeing. Optical materials, particularly spectacle lenses are required to have, in addition to a low specific gravity, a high clearness, a low yellowness, optical properties such as a high refractive index and a large Abbe's number. Since a large refractive index reduces the thickness of a lens, many examination has been made thereon to date and many novel compounds have been proposed. Recently, many organic compounds having sulfur atom and/or selenium atom have been proposed to achieve a high refractive index and a high Abbe's number. For example, Japanese Patent Application Laid-Open No. 5-148340 proposes a branched polythiol compounds having four sulfur atoms, Japanese Patent Application Laid-Open No. 6-192250 proposes a dithiol compound having a dithiane ring structure, Japanese Patent Application Laid-Open No. 11-130771 proposes a cyclic compound having selenium atom, Japanese Patent Application Laid-Open No. 11-124363 proposes a polythiol compound having selenium atom, Japanese Patent Application Laid-Open No. 9-110979 proposes a straight-chain polyepisulfide compound, Japanese Patent Application Laid-Open No. 9-71580 proposes a branched polyepisulfide compound, Japanese Patent Application Laid-Open No. 9-255781 proposes a polyepisulfide compound having a cyclic structure, and Japanese Patent Application Laid-Open No. 11-140046 proposes a polyepisulfide compound having selenium atom. However, in the proposed techniques, the refractive index is determined mainly by the chemical structure of the organic compounds having sulfur atom and/or selenium atom. Therefore, it has been demanded to develop a compound with a higher sulfur content to achieve a higher refractive index.

DISCLOSURE OF INVENTION

An object of the present invention is to develop a technique that enables to easily achieve a higher refractive index and to provide an optical material exhibiting a higher refractive index.

As a result of intensive study in view of the object, the inventors have found that an optical material produced by polymerization-curing a composition containing a compound represented by the following Formula 1:

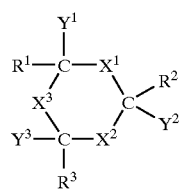

(1)

wherein $R^1$, $R^2$ and $R^3$ are each independently $C_1$–$C_{10}$ hydrocarbyl or hydrogen; $X^1$, $X^2$ and $X^3$ are each independently S, Se or Te; $Y^1$, $Y^2$ and $Y^3$ are each independently $-S_a-[(CH_2)_bS]_cH$, a is an integer from 0 to 2, b is an integer from 0 to 4, and c is an integer from 0 to 2, exhibits a higher refractive index, thereby achieving the above object.

BEST MODE FOR CARRYING OUT THE INVENTION

The compound of Formula 1 used in the present invention imparts a high refractive index, a high Abbe's number and a good balanced thereof to an optical material. To achieve a high refractive index effectively, the content of the compound of Formula 1 is preferably 1 to 99 parts by weight, more preferably 5 to 95 parts by weight based on 100 parts by weight of the composition for optical materials.

The composition for optical materials used in the present invention is a mixture containing, as the essential components, the compound of Formula 1 and a compound that is reactive to at least one of the compounds of Formula 1. The manner of reaction between the compound of Formula 1 and the reactive compound is roughly classified into a ring opening reaction of the ring structure of the compound of Formula 1 and a reaction attributable to mercaptan of the side chain. The former reaction is a usual ionic ring opening reaction that is initiated by anion or cation. The later reaction is mainly an addition reaction to a double bond or an unsaturated bond of a three-membered ring, for example, known as the addition to an isocyanate compound, the addition to an episulfide compound, and the addition to a methacrylate compound. In addition, it is known that these compounds are reacted in various manners such as oxidative coupling reaction and condensation reaction. The reactive compound is not specifically limited as far as it is polymerization-cured in the above manner to provide a transparent resin that is suitable as optical materials.

In Formula 1, each of $X^1$, $X^2$ and $X^3$ may be any of S, Se and Te, and preferably S or Se, more preferably S. Each of $Y^1$, $Y^2$ and $Y^3$ is $-S_a-[(CH_2)_bS]_cH$, wherein a is an integer of 0 to 2, b is an integer of 0 to 4, and c is an integer of 0 to 2, preferably a is 0 or 1, b is an integer of 0 to 3, and c is 0 or 1. $R^1$, $R^2$ and $R^3$ are each independently $C_1$–$C_{10}$ hydrocarbyl or hydrogen, preferably $C_1$–$C_5$ hydrocarbyl or hydrogen.

Examples of the compounds of Formula 1 wherein $X^1$, $X^2$ and $X^3$ are S (trithiane compounds) include 1,3,5-trithiane, 2-mercapto-1,3,5-trithiane, 2,4-dimercapto-1,3,5-trithiane, 2,4,6-trimercapto-1,3,5-trithiane, 2-mercaptomethyl-1,3,5-trithiane, 2,4-dimercaptomethyl-1,3,5-trithiane, 2,4,6-trimercaptomethyl-1,3,5-trithiane, 2-mercaptoethyl-1,3,5-trithiane, 2,4-dimercaptoethyl-1,3,5-trithiane, 2,4,6-trimercaptoethyl-1,3,5-trithiane, 2-mercaptopropyl-1,3,5-trithiane, 2,4-dimercaptopropyl-1,3,5-trithiane, 2,4,6-trimercaptopropyl-1,3,5-trithiane, 2-mercaptobutyl-1,3,5-trithiane, 2,4-dimercaptobutyl-1,3,5-trithiane, 2,4,6-trimercaptobutyl-1,3,5-trithiane, 2-mercaptomethylthio-1,3,5-trithiane, 2,4-bis(mercaptomethylthio)-1,3,5-trithiane, 2,4,6-tris(mercaptomethylthio)-1,3,5-trithiane, 2-mercaptoethylthio-1,3,5-trithiane, 2,4-bis(mercaptoethylthio)-1,3,5-trithiane, 2,4,6-tris(mercaptoethylthio)-1,3,5-trithiane, 2-mercaptopropylthio-1,3,5-trithiane, 2,4-bis(mercaptopropylthio)-1,3,5-trithiane, 2,4,6-tris(mercaptopropylthio)-1,3,5-trithiane, 2-mercaptobutylthio-1,3,5-trithiane, 2,4-bis(mercaptobutylthio)-1,3,5-trithiane, 2,4,6-tris(mercaptobutylthio)-1,3,5-trithiane, 2-mercaptoethylthioethyl-1,3,5-trithiane, 2,4-bis(mercapto-ethylthioethyl)-1,3,5-trithiane, 2,4,6-tris(mercaptoethylthio-ethyl)-1,3,5-trithiane, 2-mercaptoethylthioethylthio-1,3,5-trithiane, 2,4-bis(mercaptoethylthioethylthio)-1,3,5-trithiane, and 2,4,6-tris(mercaptoethylthioethylthio)-1,3,5-trithiane.

Examples of the compound of Formula 1 wherein any one of $X^1$, $X^2$ and $X^3$ is Se include compounds derived from the above trithiane compounds by replacing one, two or three of $X^1$, $X^2$ and $X^3$ with Se.

Examples of the compound of Formula 1 wherein any one of $X^1$, $X^2$ and $X^3$ is Te include compounds derived from the above trithiane compounds by replacing one, two or three of $X^1$, $X^2$ and $X^3$ with Te.

Some of the compounds of Formula 1 are commercially easily available. The compounds not available can be synthesized by a known method such as a method proposed in Kjell Olsson et al., Chemica Scripta, 16, 130–133(1980) or Guy Levesque et al., Tetrahedron Lett., 3847–3848(1978).

The composition of the present invention comprises, in addition to the compound of Formula 1, a compound reactive to at least one of the compounds of Formula 1. The reactive compound preferably includes organic compounds having sulfur atom, iso(thio)cyanate compounds, epoxy compounds, mercaptan compounds, vinyl compounds, allyl compounds, acryl compounds and methacryl compounds. More preferably, the reactive compound is a compound highly copolymerizable with the compound of Formula 1, i.e., the iso(thio)cyanate compound or a compound having a group represented by the following Formula 2:

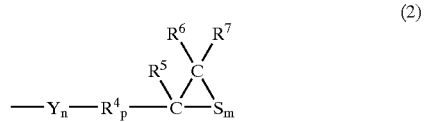

(2)

wherein $R^4$ is $C_1$–$C_{10}$ hydrocarbyl; $R^5$, $R^6$ and $R^7$ are each independently $C_1$–$C_{10}$ hydrocarbyl or hydrogen; Y is O, S, Se or Te; m is an integer from 1 to 5; n is an integer from 0 to 5; and p is 0 or 1.

Preferably, $R^4$ is $C_1$–$C_2$ hydrocarbyl; each of $R^5$, $R^6$ and $R^7$ is $C_1$–$C_2$ hydrocarbyl or hydrogen; Y is S, Se or Te; m is an integer from 1 to 3; and n is an integer from 0 to 2.

Examples of the reactive compounds will be shown below.

(I) Compound Having Group of Formula 2

Episulfide Compounds Having Aliphatic Chain Backbone:
1,1-Bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(β-epithiopropyl)-1-(β-epithiopropyl)-2-thiapropane 1,5-bis(β-epithiopropyl)-2,4-bis(β-epithiopropyl)-3-thiapentane, 1,3- or 1,4-bis(β-epithioethyl)cyclohexane, bis[4-(epithioethyl)cyclohexyl]methane, bis[4-(β-epithiopropyl)cyclohexyl]methane, 2,2-bis[4-(epithioethyl)cyclohexyl]propane, 2,2-bis[4-(β-epithiopropyl)cyclohexyl]propane, bis[4-(β-epithiopropyl)cyclohexyl]sulfide, bis[4-(epithioethyl)cyclohexyl]sulfide, 2,5-bis(epithioethyl)-1,4-dithiane, 2,5-bis(β-epithiopropyl)-1,4-dithiane, 4-epithioethyl-1,2-cyclohexene sulfide, 4-epoxy-1,2-cyclohexene sulfide, 2,3-, 2,5- or 2,6-bis(1,2-epithioethyl)-1,4-diselenane, 2,3-,2,5- or 2,6-bis(2,3-epithiopropyl)-1,4-diselenane, 2,4-, 2,5- or 2,6-bis(1,2-epithioethyl)-1,3-diselenane, 2,4-, 2,5- or 2,6-bis(2,4-epithiopropyl)-1,3-diselenane, 2,3-, 2,5-, 2,6- or 3,5-bis(1,2-epithioethyl)-1-thia-4-selenane, 2,3-, 2,5-, 2,6- or 3,5-bis(2,3-epithiopropyl)-1-thia-4-selenane, 2,4- or 4,5-bis(1,2-epithioethyl)-1,3-diselenolane, 2,4- or 4,5-bis(2,4-epithiopropyl)-1,3-diselenolane, 2,4-, 2,5- or 4,5-bis(1,2-epithioethyl)-1-thia-3-selenolane, 2,4-, 2,5- or 4,5-bis(2,4-epithiopropyl)-1-thia-3-selenolane, 2,3-, 2,4-, 2,5- or 3,4-bis(1,2-epithioethyl)selenophane, 2,3-, 2,4-, 2,5- or 3,4-bis(2,3-epithiopropyl)selenophane, 2,3-, 2,5-, 2,6-bis(1,2-epithioethyl)-1,4-ditellurane, 2,3-, 2,5- or 2,6-bis(2,3-epithiopropyl)-1,4-ditellurane, 2,4-, 2,5- or 2,6-bis(1,2-epithioethyl)-1,3-ditellurane, 2,4-, 2,5- or 2,6-bis(2,4-epithiopropyl)-1,3-ditellurane, 2,3-, 2,5-, 2,6- or 3,5-bis(1,2-epithioethyl)-1-thia-4-tellurane, 2,3-, 2,5-, 2,6- or 3,5-bis(2,3-epithiopropyl)-1-thia-4-tellurane, 2,4- or 4,5-bis(1,2-epithioethyl)-1,3-ditellurolane, 2,4- or 4,5-bis(2,4-epithiopropyl)-1,3-ditellurolane, 2,4-, 2,5- or 4,5-bis(1,2-epithioethyl)-1-thia-3-tellurolane, 2,4-, 2,5- or 4,5-bis(2,4-epithiopropyl)-1-thia-3-tellurolane, 2,3-, 2,4-, 2,5- or 3,4-bis(1,2-epithioethyl)tellurophane, 2,3-, 2,4-, 2,5- or 3,4-bis(2,3-epithiopropyl)tellurophane, 1,3- or 1,4-bis(epithioethyl)benzene, 1,3- or 1,4-bis(β-epithiopropyl)benzene, bis[4-(epithioethyl)phenyl]methane, bis[4-(β-epithiopropyl)phenyl]methane, 2,2-bis[4-(epithioethyl)phenyl]propane, 2,2-bis[4-(β-epithiopropyl)phenyl]propane, bis[4-(epithioethyl)phenyl]sulfide, bis[4-(β-epithiopropyl)phenyl]sulfide, bis[4-(epithioethyl)phenyl]sulfone, bis[4-(β-epithiopropyl)phenyl]sulfone, 4,4'-bis(epithioethyl)biphenyl, and 4,4'-bis(β-epithiopropyl)biphenyl.

Thioglycidyl Ether Compounds:
Methylthioglycidyl ether, ethylthioglycidyl ether, propylthioglycidyl ether, and butylthioglycidyl ether.

Episulfide Compounds Having at Least One Epithioalkyloxy Group:
Bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, bis(5,6-epithio-3-oxahexyl) selenide, bis(5,6-epithio-3-oxahexyl) telluride, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β- epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(β-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane, 1,11-bis(β-epithiopropyloxy)- 4,7-bis(β-epithiopropyloxymethyl)-3,6,9-trithiaundecane, 1,3- or 1,4-bis(β-epithiopropyloxy)cyclohexane, 1,3- or 1,4-bis(β-epithiopropyloxymethyl)cyclohexane, bis[4-(β-epithiopropyloxy)cyclohexyl]methane, 2,2-bis[4-(β-epithiopropyloxy)cyclohexyl]propane, bis[4-(β-epithiopropyloxy)cyclohexyl]sulfide, 2,5-bis(β-epithiopropyloxymethyl)-1,4-dithiane, 2,5-bis(β-epithiopropyloxyethyloxymethyl)-1,4-dithiane, 2,4- or 4,5-bis(3,4-epithio-1-oxabutyl)-1,3-diselenolane, 2,4- or 4,5-bis(4,5-epithio-2-oxapentyl)-1,3-diselenolane, 2,4-, 2,5- or 4,5-bis(3,4-epithio-1-oxabutyl)-1-thia-3-selenolane, 2,4-, 2,5- or 4,5-bis(4,5-epithio-2-oxapentyl)-1-thia-3-selenolane, bis(3,4-epithio-1-oxabutyl)tricycloselenaoctane, bis(3,4-epithio-1-oxabutyl)dicycloselenanonane, 2,3-, 2,4-, 2,5- or 3,4-bis(3,4-epithio-1-oxabutyl)selenophane, 2,3-, 2,4-, 2,5- or 3,4-bis(4,5-epithio-2-oxapentyl)selenophane, 2,3-, 2,5- or 2,6-bis(3,4-epithio-1-oxabutyl)-1,4-diselenane, 2,3-, 2,5- or 2,6-bis(4,5-epithio-2-oxapenyyl)-1,4-diselenane, 2,4-, 2,5- or 2,6-bis(3,4-epithio-1-oxabutyl)-1,3-diselenane, 2,4-, 2,5- or 2,6-bis(4,5-epithio-2-oxapentyl)-1,3-diselenane, 2,3-, 2,5-, 2,6- or 3,5-bis(3,4-epithio-1-oxabutyl)-1-thia-4-selenane, 2,3-, 2,5-, 2,6- or 3,5-bis(4,5-epithio-2-oxapentyl)-1-thia-4-selenane, 2,4- or 4,5-bis(3,4-epithio-1-oxabutyl)-1,3-ditellurolane, 2,4- or 4,5-bis(4,5-epithio-2-oxapentyl)-1,3-ditellurolane, 2,4-, 2,5- or 4,5-bis(3,4-epithio-1-oxabutyl)-1-thia-3-tellurolane, 2,4-, 2,5- or 4,5-bis(4,5-epithio-2-oxapentyl)-1-thia-3-tellurolane, bis(3,4-epithio-1-oxabutyl)tricycloteluraoctane, bis(3,4-epithio-1-oxabutyl)dicycloteluranonane, 2,3-, 2,4-, 2,5- or 3,4-bis(3,4-epithio-1-oxabutyl)tellurophane, 2,3-, 2,4-, 2,5- or 3,4-bis(4,5-epitho-2-oxapentyl)tellurophane, 2,3-, 2,5- or 2,6-bis(3,4-epithio-1-oxabutyl)-1,4-ditellurane, 2,3-, 2,5- or 2,6-bis(4,5-epithio-2-oxapentyl)-1,4-ditellurane, 2,4-, 2,5- or 2,6-bis(3,4-epithio-1-oxabutyl)-1,3-ditellurane, 2,4-, 2,5- or 2,6-bis(4,5-epithio-2-oxapentyl)-1,3-ditellurane, 2,3-, 2,5-, 2,6- or 3,5-bis(3,4-epithio-1-oxabutyl)-1-thia-4-tellurane, 2,3-, 2,5-, 2,6- or 3,5-bis(4,5-epithio-2-oxapentyl)-1-thia-4-tellurane, 1,3- or 1,4-bis(β-epithiopropyloxy)benzene, 1,3- or 1,4-bis(β-epithiopropyloxymethyl)benzene, bis[4-(β-epithiopropyl)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, and 4,4'-bis(β-epithiopropylthio)biphenyl.

Episulfide Compounds Having at Least One Epithioalkylthio Group:

Bis(β-epithiopropyl) sulfide, bis(β-epithiopropyl) disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)- 5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-α-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane, 1,1,1-tri[2-(β-epithiopropylthiomethyl)acetylmethyl]propane, bis(5,6-epithio-3-thiahexyl) selenide, 2,3-bis(6,7-thioepoxy-1-selena-4-thiaheptyl)-1-(3,4-thioepoxy-1-thiabutyl)propane, 1,1,3,3-tetrakis(4,5-thioepoxy-2-thiapentyl)-2-selenapropane, bis(4,5-thioepoxy-2-thiapentyl)-3,6,9-triselenaundecane-1,11-bis(3,4-thioepoxy-1-thiabutyl), 1,4-bis(3,4-thioepoxy-1-thiabutyl)-2,3-bis(6,7-thioepoxy-1-selena-4-thiaheptyl)butane, tris(4,5-thioepoxy-2-thiapentyl)-3-selena-6-thiaoctane-1,8-bis(3,4-thioepoxy-1-thiabutyl), bis(5,6-epithio-3-thiahexyl) telluride, 2,3-bis(6,7-thioepoxy-1-tellura-4-thiaheptyl)-1-(3,4-thioepoxy-1-thiabutyl)propane, 1,1,3,3-tetrakis(4,5-thioepoxy-2-thiapentyl)-2-tellurapropane, bis(4,5-thioepoxy-2-thiapentyl)-3,6,9-tritelleraundecane-1,11-bis(3,4-thioepoxy-1-thiabutyl), 1,4-bis(3,4-thioepoxy-1-thiabutyl)-2,3-bis(6,7-thioepoxy-1-tellura-4-thiaheptyl)butane, tris(4,5-thioepoxy-2-thiapentyl)-3-tellura-6-thiaoctane-1,8-bis(3,4-thioepoxy-1-thiabutyl), 1,3- or 1,4-bis(β-epithiopropylthio)cyclohexane, 1,3- or 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithiane, 2,5-bis(β-epithiopropylthioethylthiomethyl)-1,4-dithiane, 2,3-, 2,5- or 2,6-bis(3,4-epithio-1-thiabutyl)-1,4-diselenane, 2,3-, 2,5- or 2,6-bis(4,5-epithio-2-thiapentyl)-1,4-diselenane, 2,4-, 2,5- or 5,6-bis(3,4-epithio-1-thiabutyl)-1,3-diselenane, 2,4-, 2,5- or 5,6-bis(4,5-epithio-2- thiapentyl)-1,3-diselenane, 2,3-, 2,5-, 2,6- or 3,5-bis(3,4-epithio-1-thiabutyl)-1-thia-4-selenane, 2,3-, 2,5-, 2,6- or 3,5-bis(4,5-epithio-2-thiapentyl)-1-thia-4-selenane, 2,4- or 4,5-bis(3,4-epithio-1-thiabutyl)-1,3-diselenolane, 2,4- or 4,5-bis(4,5-epithio-2-thiapentyl)-1,3-diselenolane, 2,4-, 2,5- or 4,5-bis(3,4-epithio-1-thiabutyl)-1-thia-3-selenolane, 2,4-, 2,5- or 4,5-bis(4,5-epithio-2-thiapentyl)-1-thia-3-selenolane, 2,6-bis(4,5-epithio-2-thiapentyl)-1,3,5-triselenane, bis(3,4-epithio-1-thiabutyl)-tricycloselenaoctane, bis(3,4-epithio-1-thiabutyl)dicycloselenanonane, 2,3-, 2,4-, 2,5- or 3,4-bis(3,4-epithio-1-thiabutyl)selenophane, 2,3-, 2,4-, 2,5- or 3,4-bis(4,5-epithio-2-thiapentyl)selenophane, 2-(4,5-thioepoxy-2-thiapentyl)-5-(3,4-thioepoxy-1-thiabutyl)-1-selenacyclohexane, 2,3-, 2,4-, 2,5-, 2,6-, 3,4-, 3,5- or 4,5-bis(3,4-epoxy-1-thiabutyl)-1-selenacyclohexane, 2,3-, 2,4-, 2,5-, 2,6-, 3,4-, 3,5- or 4,5-bis(4,5-thioepoxy-2-thiapentyl)-1-selenacyclohexane, 2,3-, 2,5- or 2,6-bis(3,4-epithio-1-thiabutyl)-1,4-ditellurane, 2,3-, 2,5- or 2,6-bis(4,5-epithio-2-thiapentyl)-1,4-ditellurane, 2,4-, 2,5- or 5,6-bis(3,4-epithio-1-thiabutyl)-1,3-ditellurane, 2,4-, 2,5- or 5,6-bis(4,5-epithio-2-thiapentyl)-1,3-ditellurane, 2,3-, 2,5-, 2,6- or 3,5-bis(3,4-epithio-1-thiabutyl)-1-thia-4-tellurane, 2,3-, 2,5-, 2,6- or 3,5-bis(4,5-epithio-2-thiapentyl)-1-thia-4-tellurane, 2,4- or 4,5-bis(3,4-epithio-1-thiabutyl)-1,3-ditellurolane, 2,4- or 4,5-bis(4,5-epithio-2-thiapentyl)-1,3-ditellurolane, 2,4-, 2,5- or 4,5-bis(3,4-epithio-1-thiabutyl)-1-thia-3-tellurolane, 2,4-, 2,5- or 4,5-bis(4,5-epithio-2-thiapentyl)-1-thia-3-tellurolane, 2,6-bis(4,5-epithio-2-thiapentyl)-1,3,5-tritellurane, bis(3,4-epithio-1-thiabutyl)tricyclotelluraoctane, bis(3,4-epithio-1-thiabutyl)dicyclotelluranonane, 2,3-, 2,4-, 2,5- or 3,4-bis(3,4-epithio-1-thiabutyl)tellurophane, 2,3-, 2,4-, 2,5- or 3,4-bis(4,5-epithio-2-thiapentyl)tellurophane, 2-(4,5-thioepoxy-2-thiapentyl)-5-(3,4-thioepoxy-1-thiabutyl)-1-telluracyclohexane, 2,3-, 2,4-, 2,5-, 2,6-, 3,4-, 3,5- or 4,5-bis(3,4-thioepoxy-1-thiabutyl)-1-telluracyclohexane, 2,3-, 2,4-, 2,5-, 2,6-, 3,4-, 3,5- or 4,5-bis(4,5-thioepoxy-2-thiapentyl)-1-telluracyclohexane, 1,3- or 1,4-bis(β-epithiopropylthio)benzene, 1,3- or 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, and 4,4'-bis(β-epithiopropylthio)biphenyl.

Episulfide Compounds Having at Least One Epithioalkylseleno Group:

Bis(β-epithiopropyl) selenide, bis(β-epithiopropyl) diselenide, bis(β-epithiopropyl) triselenide, bis(β-epithiopropylseleno)methane, 1,2-bis(β-epithiopropylseleno)ethane, 1,3-bis(β-epithiopropylseleno)propane, 1,2-bis(β-epithiopropylseleno)propane, 1-(β-epithiopropylseleno)-2-(β-epithiopropylselenomethyl)propane, 1,4-bis(β-epithiopropylseleno)butane, 1,3-bis(β-epithiopropylseleno)butane, 1-(β-epithiopropylseleno)-3-(β-epithiopropylselenomethyl)butane, 1,5-bis(β-epithiopropylseleno)pentane, 1-(β-epithiopropylseleno)-4-(β-epithiopropylselenomethyl)pentane, 1,6-bis(β-epithiopropylseleno)hexane, 1-(β-epithiopropylseleno)-5-(β-epithiopropylselenomethyl)hexane, 1-(β-epithiopropylseleno)-2-[(2-β-epithiopropylselenoethyl)thio]ethane, 1-(β-epithiopropylseleno)-2-[[2-(2-β-epithiopropylselenoethyl)selenoethyl]thio]ethane, tetrakis(β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8-bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris(β-epithiopropylselenomethyl)-3,6-dithiaoctane, 1,8-bis(β-epithiopropylseleno)-2,5-bis(β-epithiopropylselenomethyl)-3,6-dithiaoctane, 1,9-bis(β-epithiopropylseleno)-5-(β-epithiopropylselenomethyl)-5-[(2-β-epithiopropylselenoethyl)selenomethyl]- 3,7-dithianonane, 1,10-bis(β-epithiopropylseleno)-5,6-bis[(2-1-epithiopropylselenoethyl)thio]-3,6,9-trithiadecane, 1,11-bis(β-epithiopropylseleno)-4,8-bis(β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-(β-epithiopropylseleno)acetylmethyl]methane, 1,1,1-tri[2-(β-epithiopropylseleno)acetylmethyl]propane, tetra[2-(β-epithiopropylselenomethyl)acetylmethyl]methane, 1,1,1-tri[2-(β-epithiopropylselenomethyl)acetylmethyl]propane, bis(5,6-epithio-3-selenohexyl) selenide, 2,3-bis(6,7-thioepoxy-1-selena-4-selenoheptyl)-1-(3,4-thioepoxy-1-selenobutyl)propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl) telluride, 2,3-bis(6,7-thioepoxy-1-tellura-4-selenoheptyl)-1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelleraundecane-1,11-bis(3,4-thioepoxy-1-selenobutyl), 1,4-bis (3,4-thioepoxy-1-selenobutyl)-2,3-bis(6,7-thioepoxy-1-tellura-4-selenoheptyl)butane, tris(4,5-thiepoxy-2-selenopentyl)-3-tellura-6-thiaoctane-1,8-bis(3,4-thioepoxy-1-selenobutyl), 1,3- or 1,4-bis(β-epithiopropylseleno)cyclohexane, 1,3- or 1,4-bis(β-epithiopropylselenomethyl)cyclohexane, bis[4-(β-epithiopropylseleno)cyclohexyl]methane, 2,2-bis[4-(β-epithiopropylseleno)cyclohexyl]propane, bis[4-(β-epithiopropylseleno)cyclohexyl]sulfide, 2,5-bis(β-epithiopropylselenomethyl)- 1,4-dithiane, 2,5-bis(β-epithiopropylselenoethylthiomethyl)-1,4-dithiane, 2,3-, 2,5- or 2,6-bis(3,4-epithio-1-selenobutyl)-1,4-diselenane, 2,3-, 2,5- or 2,6-bis(4,5-epithio-2-selenopentyl)-1,4-diselenane, 2,4-, 2,5- or 5,6-bis(3,4-epithio-1-selenobutyl)-1,3-diselenane, 2,4-, 2,5- or 5,6-bis(4,5-epithio-2-selenopentyl)-1,3-diselenane, 2,3-, 2,5-, 2,6- or 3,5-bis(3,4-epithio-1-selenobutyl)-1-thia-4-selenane, 2,3-, 2,5-, 2,6- or 3,5-bis(4,5-epithio-2-selenopentyl)-1-thia-4-selenane, 2,4- or 4,5-bis(3,4-epithio-1-selenobutyl)-1,3-diselenolane, 2,4- or 4,5-bis(4,5-epithio-2-selenopentyl)-1,3-diselenolane, 2,4-, 2,5- or 4,5-bis(3,4-epithio-1-selenobutyl)-1-thia-3-selenolane, 2,4-, 2,5- or 4,5-bis(4,5-epithio-2-selenopentyl)-1-thia-3-selenolane, 2,6-bis(4,5-epithio-2-selenopentyl)-1,3,5-triselenane, bis(3,4-epithio-1-selenobutyl)tricycloselenaoctane, bis(3,4-epithio-1-selenobutyl)dicycloselenanonane, 2,3-, 2,4-, 2,5- or 3,4-bis(3,4-epithio-1-selenobutyl)selenophane, 2,3-, 2,4-, 2,5-, 3,4-bis(4,5-epithio-2-selenopentyl)selenophane, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- or 4,5-bis(3,4-thioepoxy-1-selenobutyl)-1-selenacyclohexane, 2,3-, 2,4-, 2,5-, 2,6-, 3,4-, 3,5- or 4,5-bis(4,5-thioepoxy-2-selenopentyl)-1-selenacyclohexane, 2,3-, 2,5- or 2,6-bis(3,4-epithio-1-selenobutyl)-1,4-ditellurane, 2,3-, 2,5- or 2,6-bis(4,5-epithio-2-selenopentyl)-1,4-ditellurane, 2,4-, 2,5- or 5,6-bis(3,4-epithio-1-selenobutyl)-1,3-ditellurane, 2,4-, 2,5- or 5,6-bis(4,5-epithio-2-selenopentyl)-1,3-ditellurane, 2,3-, 2,5-, 2,6- or 3,5-bis(3,4-epithio-1-selenobutyl)-1-thia-4-tellurane, 2,3-, 2,5-, 2,6- or 3,5-bis(4,5-epithio-2-selenopentyl)-1-thia-4-tellurane, 2,4- or 4,5-bis(3,4-epithio-1-selenobutyl)-1,3-ditellurolane, 2,4- or 4,5-bis(4,5-epithio-2-selenopentyl)-1,3-ditellurolane, 2,4-, 2,5- or 4,5-bis(3,4-epithio-1-selenobutyl)-1-thia-3-telluroane, 2,4-, 2,5- or 4,5-bis(4,5-epithio-2-selenopentyl)-1-thia-3-tellurolane, 2,6-bis(4,5-epithio-2-selenopentyl)-1,3,5-tritellurane, bis(3,4-epithio-1-selenobutyl)tricyclotelluraoctane, bis(3,4-epithio-1-selenobutyl)dicyclotelluranonane, 2,3-, 2,4-, 2,5- or 3,4-bis(3,4-epithio-1-selenobutyl)tellurophane, 2,3-, 2,4-, 2,5- or 3,4-bis(4,5-epithio-2-selenopentyl)tellurophane, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- or 4,5-bis(3,4-thioepoxy-1-selenobutyl)-1-telluracyclohexane, 2,3-, 2,4-, 2,5-, 2,6-, 3,4-, 3,5- or 4,5-bis(4,5-thioepoxy-2-selenopentyl)-1-telluracyclohexane, 1,3- or 1,4-bis(β-epithiopropylseleno)benzene, 1,3- or 1,4-bis(β-epithiopropylselenomethyl)benzene, bis[4-(β-epithiopropylseleno)phenyl]methane, 2,2-bis[4-(β-epithiopropylseleno)phenyl]propane, bis[4-(β-epithiopropylseleno)phenyl]sulfide, bis[4-(β-epithiopropylseleno)phenyl]sulfone, and 4,4'-bis(β-epithiopropylseleno)biphenyl.

Episulfide Compounds Having at Least One Epithioalkyltelluro Group:

Bis(β-epithiopropyl) telluride, bis(β-epidithiopropyl) telluride, bis(β-epithiopropyl)ditelluride, bis(β-epidithiopropyl) ditelluride, bis(β-epithiopropyl)tritelluride, bis(β-epithiopropyltelluro)methane, 1,2-bis(β-epithiopropyltelluro)ethane, 1,3-bis(β-epithiopropyltelluro)propane, 1,2-bis(β-epithiopropyltelluro)propane, bis(epithioethyl) telluride, bis(epithioethyl) ditelluride, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)-butane, 1,5-bis(β-epithiopropyltelluro)pentane, 1-(β-epithiopropyltelluro)-4-(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[(2-β-epithiopropyltelluroethyl)thio]ethane, 1-(β-epithiopropyltelluro)-2-[[2-(2-β-epithiopropyltelluroethyl)telluroethyl]thio]ethane, tetrakis(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro)acetylmethyl]methane, 1,1,1-tri[2-(β-epithiopropyltelluro)acetylmethyl]propane, tetra[2-(β-epithiopropyltelluromethyl)acetylmethyl]methane, 1,1,1-tri[2-(β-epithiopropyltelluromethyl)acetylmethyl]propane, bis(5,6-epithio-3-tellurohexyl) selenide, 2,3-bis(6,7-thioepoxy-1-selena-4-telluroheptyl)-1-(3,4-thioepoxy-1-tellurobutyl) propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl) telluride, 2,3-bis(6,7-thioepoxy-1-tellura-4-telluroheptyl)-1-(3,4-thioepoxy-1-tellurobutyl)propane, 1,1,3,3-tetrakis(4,5-thioepoxy-2-telluropentyl)-2-tellurapropane, bis(4,5-thioepoxy-2-telluropentyl)-3,6,9-tritelleraundecane-1,11-bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane, tris(4,5-thiepoxy-2-telluropentyl)-3-tellura-6-thiaoctane-1,8-bis(3,4-thioepoxy-1-tellurobutyl), 1,3- or 1,4-bis(β-epithiopropyltelluro)cyclohexane, 1,3- or 1,4-bis(β-epithiopropyltelluromethyl)cyclohexane, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl]sulfide, 2,5-bis(β-epithiopropyltelluromethyl)-1,4-dithiane, 2,5-bis(β-epithiopropyltelluroethylthiomethyl)-1,4-dithiane, 2,3-, 2,5- or 2,6-bis(3,4-epithio-1-tellurobutyl)-1,4-diselenane, 2,3-, 2,5- or 2,6-bis(4,5-epithio-2-telluropentyl)-1,4-diselenane, 2,4-, 2,5- or 5,6-bis(3,4-epithio-1-tellurobutyl)-1,3-diselenane, 2,4-, 2,5- or 5,6-bis(4,5-epithio-2-telluropentyl)-1,3-diselenane, 2,3-, 2,5-, 2,6- or 3,5-bis(3,4-epithio-1-tellurobutyl)-1-thia-4-selenane, 2,3-, 2,5-, 2,6- or 3,5-bis(4,5-epithio-2-telluropentyl)-1-thia-4-selenolane, 2,4- or 4,5-bis(3,4-epithio-1-tellurobutyl)-1,3-diselenolane, 2,4- or 4,5-bis(4,5-epithio-2-telluropentyl)-1,3-diselenolane, 2,4-, 2,5- or 4,5-bis(3,4-epithio-1-tellurobutyl)-1-thia-3-selenoolane, 2,4-, 2,5- or 4,5-bis(4,5-epithio-2-telluropentyl)-1-thia-3-selenolane, 2,6-bis(4,5-epithio-2-telluropentyl)-1,3,5-triselenane, bis(3,4-epithio-1-tellurobutyl)tricycloselenaoctane, bis(3,4-epithio-1-tellurobutyl)dicycloselenanonane, 2,3-, 2,4-, 2,5- or 3,4-bis(3,4-epithio-1-tellurobutyl)selenophane, 2,3-, 2,4-, 2,5- or 3,4-bis(4,5-epithio-2-telluropentyl)selenophane, 2-(4,5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- or 4,5-bis(3,4-thioepoxy-1-tellurobutyl)-1-selenacyclohexane, 2,3-, 2,4-, 2,5-, 2,6-, 3,4-, 3,5- or 4,5-bis(4,5-thioepoxy-2-telluropentyl)-1-selenacyclohexane, 2,3-, 2,5- or 2,6-bis(3,4-epithio-1-tellurobutyl)-1,4-ditellurane, 2,3-, 2,5- or 2,6-bis(4,5-epithio-2-telluropentyl)-1,4-ditellurane, 2,4-, 2,5- or 5,6-bis(3,4-epithio-1-tellurobutyl)-1,3-ditellurane, 2,4-, 2,5- or 5,6-bis(4,5-epithio-2-telluropentyl)-1,3-ditellurane, 2,3-, 2,5-, 2,6- or 3,5-bis(3,4- epithio-1-tellurobutyl)-1-thia-4-tellurane, 2,3-, 2,5-, 2,6- or 3,5-bis(4,5-epithio-2-telluropentyl)-1-thia-4-tellurane, 2,4- or 4,5-bis(3,4-epithio-1-tellurobutyl)-1,3-ditellurolane, 2,4- or 4,5-bis(4,5-epithio-2-telluropentyl)- 1,3-ditellurolane, 2,4-, 2,5- or 4,5-bis(3,4-epithio-1-tellurobutyl)-1-thia-3-tellurolane, 2,4-, 2,5- or 4,5-bis(4,5-epithio-2-telluropentyl)-1-thia-3-tellurolane, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- or 3,4-bis(3,4-epithio-1-tellurobutyl)tellurophane, 2,3-, 2,4-, 2,5- or 3,4-bis(4,5-epithio-2-telluropentyl)tellurophane, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- or 4,5-bis(3,4-thioepoxy-1-tellurobutyl)-1-telluracyclohexane, 2,3-, 2,4-, 2,5-, 2,6-, 3,4-, 3,5- or 4,5-bis(4,5-thioepoxy-2-telluropentyl)-1-telluracyclohexane, 1,3- or 1,4-bis(β-epithiopropyltelluro)benzene, 1,3- or 1,4-bis(β-epithiopropyltelluromethyl)benzene, bis[4-(β-epithiopropyltelluro)phenyl]methane, 2,2-bis[4-(β-epithiopropyltelluro)phenyl]propane, bis[4-(β-epithiopropyltelluro)phenyl]sulfide, bis[4-(β-epithiopropyltelluro)phenyl]sulfone, and 4,4'-bis(β-epithiopropyltelluro)biphenyl.

Episulfide Compounds Having Unsaturated Group:

Vinylphenyl thioglycidyl ether, vinylbenzyl thioglycidyl ether, thioglycidyl methacrylate, thioglycidyl acrylate, and allyl thioglycidyl ether.

Other Episulfide Compounds:

Ethylene sulfide, propylene sulfide, thioglycidol, thioglycidyl acetate, thioglycidyl propionate, and thioglycidyl benzoate.

Methyl-Substituted Episulfide Compounds:

Compounds listed above with its at least one hydrogen of the epithio group substituted by methyl.

(II) Isocyanate Compounds

Monoisocyanates:

Methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate, and tolyl isocyanate.

Polyisocyanates:

Diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, 2,4-tolylenediisocyanate, 2,6-tolylene diisocyanate, o-tolydyne diisocyanate, 4,4'-diphneylmethane diisocyanate, diphenyl ether diisocyanate, 3-(2'-isocyanatecyclohexyl)propyl isocyanate, tris(phenylisocyanate) thiophosphate, isopropylidene bis(cyclohexylisocyanate), 2,2'-bis(4-isoisocyanatephenyl)propane, triphenylmethane triisocyanate, bis(diisocyanatetolyl)phenylmethane, 4,4',4"-triisocyanate-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethan-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanate-1-methylethyl)benzene, 1,4-bis(1-isocyanate-1-methylethyl)benzene, 1,3-bis(2-isocyanato-2-propyl)benzene, 2,6-bis(isocyanatomethyl)naphthalene, 1,5-naphthalene diisocyanate, bis(isocyanatemethyl)tetrahydrodicyclopentadiene, bis(isocyanatemethyl)dicyclopentadiene, bis(isocyanatemethyl)tetrahydrothiophene, 2,5-diisocyanatemethylnorbornene, bis(isocyanatemethyl)adamantane, dimeric acid diisocyanate, and 1,3,5-tri(1-isoisocyanatehexyl)isocyanuric acid, dimers produced by biuret reaction of the preceding polyisocyanates, cyclic trimers of the preceding polyisocyanates, and adducts of the preceding polyisocyanates with alcohols or thiols.

Sulfur-Containing Isocyanates:

Thiodiethyl diisocyanate, thiodipropyl diisocyanate, thiodihexyl disocyanate, bis[(4-isocyanatomethyl)phenyl] sulfide, 2,5-diisocyanato-1,4-dithiane, 2,5-diisocyanatomethyl-1,4-dithiane, 2,5-diisocyanatomethyl thiophene, dithiodiethyl diisocyanate, and dithiodipropyl diisocyanate.

(III) Isothiocyanate Compounds

Isothiocyanates:

Methyl isothiocyanate, ethyl isothiocyanate, propyl isothiocyanate, isopropyl isothiocyanate, n-butyl isothiocyanate, sec-butyl isothiocyanate, tert-butyl isothiocyanate, pentyl isothiocyanate, hexyl isothiocyanate, octyl isothiocyanate, dodecyl isothiocyanate, cyclohexyl isothiocyanate, phenyl isothiocyanate, and tolyl isothiocyanate.

Polyisothiocyanate:

Ethylene diisothiocyanate, tetramethylene diisothiocyanate, hexamethylene diisothiocyanate, cyclohexane diisothiocyanate, 1,3-bis(isothiocyanatomethyl)cyclohexane, 1,4-bis(isothiocyanatomethyl)cyclohexane, isophorone diisothiocyanate, 2,6-bis(isothiocyanatomethyl)decahydronaphthalene, lysine triisothiocyanate, 1,3-phenylene diisothiocyanate, 1,4-phenylene diisothiocyanate, 4,4'-diisothiocyanatobiphenyl, 4,4'-diisocyanato-3,3'-dimethylbiphenyl, 1,1'-methylenebis(4-isothiocyanatobenzene), 1,1'-methylenebis(3-methyl-4-isothiocyanatobenzene), m-xylylene diisothiocyanate, p-xylylene diisothiocyanate, 1,3-bis(2-isothiocyanato-2-propyl)benzene, and 2,6-bis(isothiocyanatomethyl)naphthalene, dimers produced by biuret reaction of the preceding polyisothiocyanates, cyclic trimers of the preceding polyisothiocyanates, and adducts of the preceding polyisothiocyanates with alcohols or thiols.

(IV) Epoxy Compounds

Monoepoxy Compounds:

Ethylene oxide and propylene oxide.

Phenolic Epoxy Compounds:

Condensation products of epihalohydrins with polyhydric phenol compounds such as hydroquinone, catechol, resorcinol, bisphenol A, bisphenol F, bisphenol ether, halogenated bisphenol A and novolak resins.

Alcoholic Epoxy Compounds:

Condensation products of epihalohydrins with alcohol compounds such as methanol, ethanol, propanol, butanol, ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane, pentaerythritol, 1,3- or 1,4-cyclohexanediol, 1,3- or 1,4-cyclohexanedimethanol, hydrogenated bisphenol A, bisphenol A/ethylene oxide adducts, and bisphenol A/propylene oxide adducts.

Urethane Epoxy Compounds:
Products of the reaction of the above alcohol compounds and/or phenol compounds with diisocyanate compounds.

Glycidyl Ester Epoxy Compound:
Condensation products of epihalohydrins with carboxylic acids such as acetic acid, propionic acid, benzoic acid, adipic acid, sebacic acid, dodecandicarboxylic acid, dimer acid, phthalic acid, isophthalic acid, terephthalic acid, tetrahydrophthalic acid, methyltetrahydrophthalic acid, hexahydrophthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid, acrylic acid, methacrylic acid, and fumaric acid.

Amine Epoxy Compounds:
Condensation products of epihalohydrins with amine compounds such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperadine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenyl ether, 2,2-(4,4'-diaminodiphenyl)propane, N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane.

Sulfur-Containing Epoxy Compounds:
bis(β-Epoxypropyl) sulfide, bis(β-epoxypropylthio)methane, 1,2-bis(β-epoxypropylthio)ethane, 1,3-bis(β-epoxypropylthio)propane, 1,2-bis(β-epoxypropylthio)propane, 1-(β-epoxypropylthio)-2-(β-epoxypropylthiomethyl)propane, 1,4-bis(β-epoxypropylthio)butane, 1,3-bis(β-epoxypropylthio)butane, 1-(β-epoxypropylthio)-3-(β-epoxypropylthiomethyl)butane, 1,5-bis(β-epoxypropylthio)pentane, 1-(β-epoxypropylthio)-4-(β-epoxypropylthiomethyl)pentane, 1,6-bis(β-epoxypropylthio)hexane, 1-(β-epoxypropylthio)-5-(β-epoxypropylthiomethyl)hexane, 1-(β-epoxypropylthio)-2-[(2-β-epoxypropylthioethyl)thio]ethane, 1-(β-epoxypropylthio)-2-[[2-(2-β-epoxypropylthioethyl)thioethyl]thio]ethane, tetrakis(β-epoxypropylthiomethyl)methane, 1,1,1-tris(β-epoxypropylthiomethyl)propane, 1,5-bis(β-epoxypropylthio)-2-(β-epoxypropylthiomethyl)-3-thiapentane, 1,5-bis(β-epoxypropylthio)-2,4-bis(β-epoxypropylthiomethyl)-3-thiapentane, 1-(β-epoxypropylthio)-2,2-bis(β-epoxypropylthiomethyl)-4-thiahexane, 1,5,6-tris(β-epoxypropylthio)-4-(β-epoxypropylthiomethyl)-3-thiahexane, 1,8-bis(β-epoxypropylthio)-4-(β-epoxypropylthiomethyl)-3,6-dithiaoctane, 1,8-bis(β-epoxypropylthio)-4,5-bis(β-epoxypropylthiomethyl)-3,6-dithiaoctane, 1,8-bis(β-epoxypropylthio)-4,4-bis(β-epoxypropylthiomethyl)-3,6-dithiaoctane, 1,8-bis(β-epoxypropylthio)-2,4,5-tris(β-epoxypropylthiomethyl)-3,6-dithiaoctane, 1,8-bis(β-epoxypropylthio)-2,5-bis(β-epoxypropylthiomethyl)-3,6-dithiaoctane, 1,9-bis(β-epoxypropylthio)-5-(β-epoxypropylthiomethyl)-5-[(2-β-epoxypropylthioethyl)thiomethyl]-3,7-dithianonane, 1,10-bis(β-epoxypropylthio)-5,6-bis[(2-α-epoxypropylthioethyl)thio]-3,6,9-trithiadecane, 1,11-bis(β-epoxypropylthio)-4,8-bis(β-epoxypropylthiomethyl)-3,6,9-trithiaundecane, 1,11-bis(β-epoxypropylthio)-5,7-bis(β-epoxypropylthiomethyl)-3,6,9-trithiaundecane, 1,11-bis(β-epoxypropylthio)-5,7-[(2-β-epoxypropylthioethyl)thiomethyl]-3,6,9-trithiaundecane, 1,11-bis(β-epoxypropylthio)-4,7-bis(β-epoxypropylthiomethyl)-3,6,9-trithiaundecane, 1,3- or 1,4-bis(β-epoxypropylthio)cyclohexane, 1,3- or 1,4-bis(β-epoxypropylthiomethyl)cyclohexane, bis[4-(β-epoxypropylthio)cyclohexyl]methane, 2,2-bis[4-(β-epoxypropylthio)cyclohexyl]propane, bis[4-(β-epoxypropylthio)cyclohexyl]sulfide, 2,5-bis(β-epoxypropylthiomethyl)-1,4-dithiane, 1,3- or 1,4-bis(β-epoxypropylthio)benzene, 1,3- or 1,4-bis(β-epoxypropylthiomethyl)benzene, bis[4-(β-epoxypropylthio)phenyl]methane, 2,2-bis[4-(β-epoxypropylthio)phenyl]propane, bis[4-(β-epoxypropylthio)phenyl]sulfide, bis[4-(β-epoxypropylthio)phenyl]sulfone, and 4,4'-bis(β-epoxypropylthio)biphenyl.

Alicyclic Epoxy Compounds:
3,4-Epoxycyclohexyl-3,4-epoxycyclohexanecarboxylate, vinylcyclohexane dioxide, 2-(3,4-epoxycyclohexyl)-5,5-spiro-3,4-epoxycyclohexane-meta-dioxane, and bis(3,4-epoxycyclohexyl) adipate.

Epoxidized Compounds of Unsaturated Compounds:
Cyclopentadiene epoxide, epoxidized soy bean oil, epoxidized polybutadiene, and vinylcyclohexene epoxide.

Epoxy Compounds Having Unsaturated Group:
Vinylphenyl glycidyl ether, vinylbenzyl glycidyl ether, glycidyl methacrylate, glycidyl acrylate, and allyl glycidyl ether.

(V) Mercaptan Compounds

Aliphatic Mercaptan Compounds:
Methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, phenyl mercaptan, benzyl mercaptan, 3-methylphenyl mercaptan, 4-methylphenyl mercaptan, 4-chlorobenzyl mercaptan, 4-vinylbenzyl mercaptan, 3-vinylbenzyl mercaptan, methyl mercaptopropionate, 2-mercaptoethanol, 3-mercapto-1,2-propanediol, 2-mercapto-1,3-propanediol, mercaptoacetic acid, mereaptoglycolic acid, mercaptopropionic acid, methanedithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl) ether, bis(2-mercaptoethyl) sulfide, 1,2-bis(2-mercaptoethyloxy)ethane, 1,2-bis(2-mercaptoethylthio)ethane, 2,3-dimecrapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3- dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-dimercaptocyclohexane, 1,3-dimercaptocyclohexane, 1,4-dimercaptocyclohexane, 1,3-bis-(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane, and 2,5-bis(mercaptomethyl)thiophene.

Aromatic Mercaptan Compounds:

1,2-Dimercaptobenzene, 1,3-dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl) ether, bis(4-mercaptophenyl) sulfide, bis(4-mercaptophenyl) sulfone, bis(4-mercaptomethylphenyl)methane, 2,2-bis(4-mercaptomethylphenyl)propane, bis(4-mercaptomethylphenyl) ether, bis(4-mercaptomethylphenyl) sulfide, 4-hydroxythiophenol, and mercaptobenzoic acid.

(VI) Vinyl Compounds

Vinyl ether, ethyl vinyl ether, isobutyl vinyl ether, 2-ethylhexyl vinyl ether, phenyl vinyl ether, benzyl vinyl ether, 2-chloroethyl vinyl ether, cyclohexyl vinyl ether, vinyl glycidyl ether, vinylalcohol, methylvinylcarbinol, ethylene glycol monovinyl ether, ethylene glycol divinyl ether, diethylene glycol monovinyl ether, diethylene glycol divinyl ether, tetramethylene glycol monovinyl ether, divinyl sulfide, vinyl ethyl sulfide, vinyl phenyl sulfide, methyl vinyl ketone, divinyl dicarbonate, vinyl diglycol carbonate, vinylene carbonate, vinyl acetate, vinyl chloroacetate, vinyl propionate, vinyl butylate, vinyl hexanoate, vinyl 2-ethylhexanoate, divinyl adipate, vinyl benzoate, vinyl salicylate, vinyl acrylate, vinyl methacrylate, vinyl bromide, vinyl iodide, vinylphosphoric acid, vinylurea, styrene, 2-methylstyrene, 3-methylstyrene, 4-methylstyrene, α-methylstyrene, 2,4,6-trimethylstyrene, 4-t-butylstyrene, stilbene, vinylphenol, 3-vinylbenzyl alcohol, 4-vinylbenzyl alcohol, 2-(4-vinylphenylthio)ethanol, 2-(3-vinylphenylthio)ethanol, 2-(4-vinylbenzylthio)ethanol, 2-(3-vinylbenzylthio)ethanol, 1,3-bis(4-vinylbenzylthio)-2-propanol, 1,3-bis(3-vinylbenzylthio)-2-propanol, 2,3-bis(4-vinylbenzylthio)-1-propanol, 2,3-bis(3-vinylbenzylthio)-1-propanol, cinnamyl alcohol, cinnamaldehyde, 1,3-divinylbenzene, 1,4-divinylbenzene, trivinylbenzene, divinyl phthalate, 2-chlorostyrene, 3-chlorostyrene, 4-chlorostyrene, 3-chloromethylstyrene, 4-chloromethylstyrene, 4-aminostyrene, 3-cyanomethylstyrene, 4-cyanomethylstyrene, 4-vinylbiphenyl, 2,2'-divinylbiphenyl, 4,4'-divinylbiphenyl, 2,2'-distyryl ether, 4,4'-distyryl ether, 2,2'-distyryl sulfide, 4,4'-distyryl sulfide, 2,2-bis(4-vinylphenyl)propane, bis(4-vinylphenyl) ether, and 2,2-bis(4-vinyloxyphenyl)propane.

(VII) Allyl Compounds

Compounds produced by replacing all or a part of the vinyl groups of the above vinyl compounds with ally group.

(VIII) Acryl Compounds

Methyl acrylate, ethyl acrylate, propyl acrylate, butyl acrylate, cyclohexyl acrylate, 2-hydroxyethyl acrylate, 3-hydroxypropyl acrylate, 2-hydroxypropyl acrylate, 3-phenoxy-2-hydroxypropyl acrylate, trimethylolpropane monoacrylate, 2-hydroxyethyl isocyanurate monoacrylate, 2-hydroxyethyl isocyanurate diacrylate, 2-hydroxyethyl cyanurate monoacrylate, 2-hydroxyethyl cyanurate diacrylate, ethylene glycol diacrylate, diethylene glycol diacrylate, 1,3-butylene glycol diacrylate, triethylene glycol diacrylate, polyethylene glycol diacrylate, propylene glycol diacrylate, 1,3-propanediol diacrylate, 1,3-butanediol diacrylate, 1,4-butanediol diacrylate, 1,6-hexanediol diacrylate, neopentyl glycol diacrylate, polypropylene glycol diacrylate, 2-hydroxy-1,3-diacryloxypropane, 2,2-bis[4-(acryloxyethoxy)phenyl]propane, 2,2-bis[4-(acryloxyethoxy)cyclohexyl]propane, 2,2-bis[4-(2-hydorxy-3-acryloxypropoxy)phenyl]propane, 2,2-bis[4-(acryloxy.diethoxy)phenyl]propane, 2,2-bis[4-(acryloxy.polyethoxy)phenyl]propane, trimethylolpropane triacrylate, pentarythritol monoacrylate, pentarythritol diacrylate, pentarythritol triacrylate, pentarythritol tetraacrylate, bis(2,2,2-trimethylolethyl) ether pentaacrylate, bis(2,2,2-trimethylolethyl) ether hexaacrylate, and bis(4-acryloylthiophenyl) sulfide.

(IX) Methacryl Compounds

Compounds produced by replacing all or a part of the acryl groups of the above vinyl compounds with methacryl group.

The above compounds reactive to the compounds of Formula 1 are only illustrative, and not limited thereto as far as the compound is reactive to the compounds of Formula 1. These compounds may be used alone or in combination of two or more. The total addition amount of the reactive compounds is preferably 1 to 99 parts by weight, more preferably 5 to 95 parts by weight based on 100 parts by weight of the composition for optical materials.

The composition is made into optical materials, if necessary, in the presence of a curing catalyst. As the curing catalyst, usable are amine compounds, phosphine compounds, quaternary ammonium salts, quaternary phosphonium salts, tertiary sulfonium salts, secondary iodonium salts, mineral acids, Lewis acids, organic acids, silicic acids, tetrafluoroboric acids, peroxides, azo compounds, condensates of aldehyde and amine compound, guanidine compounds, thiourea compounds, thiazole compounds, sulfenamide compounds, thiuram compounds, salts of dithiocarbamic acid, salts of xanthogenic acid, and esters of acid phosphoric acid.

Examples of the curing catalysts are shown below.

(i) Amine Compounds

Primary Amines:

Ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine.

Primary Polyamines:

Ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2,2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5.5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine, and bis(3,4-diaminophenyl) sulfone.

Secondary Amines:

Diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrol, indoline, indole, and morpholine.

Secondary Polyamines:

N,N'-Dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane.

Tertiary Amines:

Trimethylamine, triethylamine, tri-n-propylamine, triisopropylamine, tri(1,2-dimethylpropyl)amine, tri(3-methoxypropyl)amine, tri-n-butylamine, triisobutylamine, tri-sec-butylamine, tri-n-pentylamine, tri-3-pentylamine, tri-n-hexylamine, tri-n-octylamine, tri(2-ethylhexyl)amine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, and 2-(2-dimethylaminoethoxy)-4-methyl-1,3,2-dioxabornane.

Tertiary Polyamines:

Tetramethylethylenediamine, pyrazine, N,N'-dimethylpiperadine, N,N'-bis(2-hydroxypropyl)piperadine, hexamethylenetetramine, N,N,N',N'-tetramethyl-1,3-butane amine, 2-dimethylamino-2-hydroxypropane, diethyaminoethanol, N,N,N-tris(3-dimethylaminopropyl)amine, 2,4,6-tris(N,N,-dimethylaminomethyl)phenol, and heptamethylisobiguanide.

Imidazoles:

Imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 2-mercaptoimidazole, 2-mercapto-N-methylimidazole, 2-mercaptobenzimidazole, 3-mercapto-4-methyl-4H-1,2,4-triazole, 5-mercapto-1-methyl-tetrazole, 2,5-dimercapto-1,3,4-thiadiazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl)methane, and addition products of alkylimidazoles and isocyanuric acid.

Amidines:

1,8-Diazabicyclo[5.4.0]undecene-7,1,5-diazabicyclo[4.3.0]nonene-5, and 6-dibutylamino-1,8-diazabicyclo[5.4.0]undecene-7.

(ii) Complexes of Amine Compounds (i) and Borane or Boron Trifluoride (iii) Phosphine Compounds Trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, and chlorodiphenylphosphine.

(iv) Quaternary Ammonium Salts

Tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium p-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethyldodecylammonium chloride, trimethylcetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyldimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpyridinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide, 1-benzylpicolinium chloride, and 1-benzylpicolinium bromide.

(v) Quaternary Phosphonium Salts

Tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride, and tetrakishydroxybutylphosphonium chloride.

(vi) Tertiary Sulfonium Salts

Trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hexylsulfonium bromide, tri-n-octylsulfonium bromide, triphenylsulfonium chloride, triphenylsulfonium bromide, and triphenylsulfonium iodide.

(vii) Secondary Iodonium Salts

Diphenyliodonium chloride, diphenyliodonium bromide, and diphenyliodonium iodide.

(viii) Mineral Acids

Hydrochloric acid, sulfuric acid, nitric acid, phosphoric acid and carbonic acid, and half-esters of these mineral acids.

(ix) Lewis Acids

Boron trifluoride, boron trifluoride etherate, aluminum fluoride, aluminum chloride, triphenylaluminum, potassium octanoate, calcium acetate, tetraisopropoxytitanium, tetrabutoxytitanium, tetrachlorotitanium, 2-ethylhexyl titanate, dimethyltin oxide, dimethyltin dichloride, dibutyltin diacetate, dibutyltin acetate, dibutyltin dilaurate, dibutyltin laurate, dibutyltin octanoate, dibutyltin bis(dodecylmercaptide), dibutyltin bis(isooctylthioglycolate), dibutyltin oxide, butyltin trichloride, dibutyltin dichloride, tributyltin chloride, tetrabutyltin, dioctyltin diacetate, dioctyltin acetate, dioctyltin dilaurate, dioctyltin laurate, dioctyltin diricinolate, dioctyltin dioleate, dioctyltin di(6-hydroxy)caproate, dioctyltin bis(isooctylthoglycolate), dioctyltin oxide, dioctyltin dichloride, dioctyltin maleate, dioctyltin bis(butylmaleate), didodecyltin diricinolate, tin stearate, zinc chloride, zinc acetylacetonato, copper oleate, copper acetylacetonato, iron acetylacetonato, iron naphthenate, iron lactate, iron citrate, and iron gluconate.

(x) Organic Acids and Semi Esters

Acetic acid, acetic anhydride, oxalic acid, chloroacetic acid, dichloroacetic acid, succinic acid, maleic acid, glutaric acid, formic acid, lactic acid, butyric acid, salicylic acid, benzoic acid, propionic acid, cinnamic acid, malonic acid, phthalic acid, acrylic acid, and esters or semi esters of these acids.

(xi) Silicic Acids

Silicic acid.

(xii) Tetrafluoroboric Acids

Tetrafluoroboric Acid (xiii) Peroxides

Cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, t-hexyl peroxyneodecanoate, t-butyl peroxyneodecanoate, t-hexyl peroxyneohexanoate, t-butyl peroxyneohexanoate, 2,4-dichlorobenzoyl peroxide, benzoyl peroxide, dicumyl peroxide, di-t-butyl peroxide, cumene hydroperoxide, and tert-butyl hydroperoxide.

(xiv) Azo Compounds 2,2'-Azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methyl)azo]formamide, 2-pneylazo-4-methoxy-2,4-dimethylvaleronitrile, 2,2'-azobis(2-methylpropane), and 2,2'-azobis(2,4,4-trimethylpentane).

(xv) Condensates of Aldehyde and Amine Compound

Reaction product of acetaldehyde and ammonia, condensate of formaldehyde and p-toluidine, condensate of acetaldehyde and p-toluidine, reaction product of formaldehyde and aniline, reaction product of acetaldehyde and aniline, reaction product of butylaldehyde and aniline, reaction product of formaldehyde, acetaldehyde and aniline, reaction product of acetaldehyde, butylaldehyde and aniline, condensate of butylaldehyde and monobutylamine, reaction product of butylaldehyde and butylideneaniline, reaction product of heptaldehyde and aniline, reaction product of trichlotonylidenetetramine, condensate of α-ethyl-β-propylacrolein and aniline, and condensate of formaldehyde and alkylimidazole.

(xvi) Guanidine Compounds

Diphenylguanidine, phenyltolylguanidine, phenylxylylguanidine, tolylxylylguanidine, di-o-tolylguanidine, o-tolylguamide, diphenylguanidine phthalate, tetramethylguanidine, and di-o-tolylguanidine salt of dicatechol boric acid.

(xvii) Thiourea Compounds

Thiocarboanilide, di-o-tolylthiourea, ethylenethiourea, diethylthiourea, dibutylthiourea, dilaurylthiourea, trimethylthiourea, dimethylethylthiourea, and tetramethylthiourea.

(xviii) Thiazole Compounds

2-Mercaptobenzothiazole, dibenzothiazyl disulfide, cyclohexylamine salt of 2-mercaptobenzothiazole, 2-(2,4-dinitrophenylthio)benzothiazole, 2-(morpholinodithio)benzothiazole, 2-(2,6-dimethyl-4-morpholinothio)benzothiazole, N,N-diethylthiocarbamoyl-2-benzothiazolyl disulfide, 1,3-bis(2-benzothiazolylmercaptomethyl)urea, benzothiadiazylthio benzoate, 2-mercaptothiazoline, sodium salt of 2-mercaptobenzothiazole, zinc salt of 2-mercaptobenzothiazole, and complex of dibenzothiazyl disulfide and zinc chloride.

(xix) Sulfenamide Compounds

N-Cyclohexyl-2-benzothiazyl sulfenamide, N-t-butyl-2-benzothiazyl sulfenamide, N-t-oxtyl-2-benzothiazyl sulfenamide, N-oxydiethylene-2-benzothiazyl sulfenamide, N,N-diethyl-2-benzothiazyl sulfenamide, N,N-diisopropyl-2-benzothiazyl sulfenamide, and N,N-dicyclohexyl-2-benzothiazyl sulfenamide.

(xx) Thiuram Compounds

Tetramethylthiuram monosulfide, tetraethylthiuram monosulfide, tetrabutylthiuram monosulfide, dipentamethylenethiuram monosulfide, tetramethylthiuram disulfide, tetraethylthiuram disulfide, tetrabutylthiuram disulfide, N,N'-dimethyl-N,N'-diphenylthiuram disulfide, N,N'-diethyl-N,N'-diphenylthiuram disulfide, dipentamethylenethiuram disulfide, dipentamethylenethiuram tetrasulfide, and cyclic thiuram.

(xxi) Salts of Dithiocarbamic Acid

Sodium dimethyldithiocarbamate, sodium diethyldithiocarbamate, sodium dibutyldithiocarbamate, sodium pentamethylenedithiocarbamate, sodium cyclohexylethyldithiocarbamate, potassium dimethyldithiocarbamate, lead dimethyldithiocarbamate, zinc dimethyldithiocarbamate, zinc diethyldithiocarbamate, zinc dibutyldithiocarbamate, zinc dibenzyldithiocarbamate, zinc pentamethylenedithiocarbamate, zinc dimethylpentamethylenedithiocarbamate, zinc ethylphenyldithiocarbamate, bismuth dimethyldithiocarbamate, cadmium diethyldithiocarbamate, cadmium pentamethylenedithiocarbamate, selenium dimethyldithiocarbamate, selenium diethyldithiocarbamate, tellurium dimethyldithiocarbamate, tellurium diethyldithiocarbamate, iron dimethyldithiocarbamate, copper dimethyldithiocarbamate, diethylammonium diethyldithiocarbamate, N,N-dicyclohexylammonium dibutyldithiocarbamate, piperidinium pentamethylenedithiocarbamate, cyclohexylethylammonium sodium cyclohexylethyldithiocarbamate, pipecolinium methylpentamethylenedithiocarbamate, and complex of zinc pentamethylenedithiocarbamate and piperidine.

(xxii) Salts of Xanthogenic Acid

Sodium isopropylxanthate, zinc isopropylxanthate, zinc butylxanthate, and disulfide dibutylxanthate.

(xxiii) Esters of Acid Phosphoric Acid

Mono- and/or dimethylphosphoric acid, mono- and/or diethylphosphoric acid, mono- and/or dipropylphosphoric acid, mono- and/or dibutylphosphoric acid, mono- and/or dihexylphosphoric acid, mono- and/or dioctylphosphoric acid, mono- and/or didecylphosphoric acid, mono- and/or didodecylphosphoric acid, mono- and/or diphenylphosphoric acid, mono- and/or dibenzylphosphoric acid, and mono- and/or didecanolphosphoric acid.

The compounds recited above are examples of the catalysts for curing the composition for optical materials containing the compounds of Formula 1. However, the curing catalyst is not limited thereto as far as the compound is effective for curing the composition by polymerization. These catalysts may be used alone or in combination of two or more. The addition amount of the catalyst is 0.0001 to 10.0 parts by weight, preferably 0.0005 to 5.0 parts by weight based on 100 parts by weight of the composition for optical materials containing the compound of Formula 1.

To improve the oxidation resistance, weathering resistance, dyeability, mechanical strength, etc. of the composition for optical materials, the composition may be cured by polymerization in the presence of a compound reactive to a part or all of the components of the composition as a property improver. When used, a polymerization-curing catalyst may be separately added for the reaction of the property improver.

The property improver may include hydroxy compounds, carboxylic acids, carboxylic anhydrides, amine compounds, and inorganic compounds having sulfur atom and/or selenium atom. Examples thereof are shown below.

(1) Hydroxy Compounds

Phenolic epoxy compounds produced by condensation of epihalohydrins with polyhydric phenol compounds such as hydroquinone, catechol, resorcinol, bisphenol A, bisphenol F, bisphenol ether, halogenated bisphenol A and novolak resins, methanol, ethanol, propanol, butanol, ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane, pentaerythritol, 1,3- or 1,4-cyclohexanediol, 1,3- or 1,4-cyclohexanedimethanol, hydrogenated bisphenol A, bisphenol A/ethylene oxide adducts, and bisphenol A/propylene oxide adducts.

(2) Carboxylic Acids

Acetic acid, propionic acid, benzoic acid, adipic acid, sebacic acid, dodecandicarboxylic acid, dimer acid, phthalic acid, isophthalic acid, terephthalic acid, tetrahydrophthalic acid, methyltetrahydrophthalic acid, hexahydrophthalic acid, HET acid, nadic acid, maleic acid, succinic acid, fumaric acid, trimellitic acid, pyromellitic acid, benzenetetracarboxylic acid, benzophenonetetracarboxylic acid, naphthalenedicarboxylic acid and diphenyldicarboxylic acid, acrylic acid, methacrylic acid, and fumaric acid.

(3) Carboxylic Anhydrides

Acetic anhydride, propionic anhydride, benzoic anhydride, adipic anhydride, sebacic anhydride, phthalic anhydride, methyltetrahydrophthalic anhydride, hexahydrophthalic anhydride, maleic anhydride, succinic anhydride, trimellitic anhydride, pyromellitic anhydride, naphthalenedicarboxylic anhydride, and maleic anhydride.

(4) Amine Compounds

Ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis-(3-aminopropyl) ether, 1,2-bis-(3-aminopropoxy)ethane, 1,3-bis-(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethyl-cyclohexane, 1,3- or 1,4-bisaminopropylcyclohexane, hydrogenated 4,4'-diaminodiphenylmethane, isophoronediamine, 1,4-bisaminopropylpiperadine, m- or p-phenylenediamine, 2,4- or 2,6-tolylenediamine, m- or p-xylylenediamine, 1,5- or 2,6-naphthalenediamine, 4,4'-diaminodiphenylmethane, 4,4'-diaminodiphenyl ether, 2,2-(4,4'-diaminodiphenyl)propane, N,N'-dimethylethylenediamine, N,N'-dimethyl-1,2-diaminopropane, N,N'-dimethyl-1,3-diaminopropane, N,N'-dimethyl- 1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane.

(5) Inorganic Compounds Having Sulfur Atom and/or Selenium Atom

Sulfur, hydrogen sulfide, carbon disulfide, carbon selenosulfide, ammonium sulfide, oxides of sulfur such as sulfur dioxide and sulfur trioxide, salts of thiocarbonic acid, sulfuric acid, salts of sulfuric acid, salts of hydrogensulfuric acid, salts of sulfurous acid, salts of hyposulfurous acid, salts of persulfuric acid, salts of thiocyanic acid, salts of thiosulfuric acid, sulfur dichloride, halides such as thionyl chloride and thiophosgen, boron sulfide, nitrogen sulfide, silicon sulfide, phosphorus sulfide, arsenic sulfide, selenium sulfide, metal sulfides, metal hydrogensulfides, selenium, hydrogen selenide, selenium dioxide, carbon diselenide, ammonium selenide, oxides of selenium such as selenium dioxide, selenic acid, salts of selenic acid, selenous acid, salts of selenous acid, salts of hydrogenselenic acid, selenosulfuric acid, salts of selenosulfuric acid, selenopyrosulfuric acid, salts of selenopyrosulfuric acid, halides such as selenium tetrabromide and selenium oxychloride, salts of selenocyanic acid, boron selenide, phosphorus selenide, arsenic selenide and metal selenides.

The compounds reactive to a part or all of the components of the composition, that is usable as the property improver, are not limited to those exemplified above. These compounds may be used alone or in combination of two or more.

The addition amount of the property improver is determined within a range not adversely affecting the optical properties and mechanical properties while taking the chemical structure into consideration. Therefore not specifically determined, and preferably 90 parts by weight or less based on 100 parts by weight of the composition for optical material containing the compound of Formula 1.

To improve the practical properties of the optical materials being produced in the present invention, the composition may be added with known additives such as antioxidants, ultraviolet absorbers, etc. When the optical material is easily separated from molds during polymerization, it is effective to use a known external and/or internal adhesion improver, thereby improving the adhesion between the cured material being formed and the mold. When the optical material is difficult to release from the molds, it is effective to add a known external and/or internal mold release improver, thereby improving the releasability of the cured material.

In the present invention, the composition for optical material containing the compound of Formula 1 is uniformly mixed with the catalyst, the adhesion or mold release improver, and the additives such as antioxidants, bluing agents, ultraviolet absorbers, and property improving additives. The resultant uniform mixture is cast into a mold made of glass or metal, cured by polymerization under heating, and then released from the mold to obtain the optical material.

A mixture containing the composition for optical material containing the compound of Formula 1 may be cast into a mold after prepolymerizing a part or whole part thereof at −100 to 160° C. for 0.1 to 480 h in the presence or absence of a catalyst with or without stirring. The prepolymerization is particularly effective when the composition for optical materials is difficult to handle because of the solid component therein. The prepolymerization is carried out preferably at −10 to 120° C. for 0.1 to 240 h, more preferably at 0 to 100° C. for 0.1 to 120 h.

The production of the optical material comprising a cured resin of the present invention will be described in more detail. As described above, a mixture of the essential components and the optional components is cast into a mold, and cured therein to the optical material. The compound of Formula 1, the compound reactive thereto, the compound used as the property improver which is reactive to a part or all of the components of the composition, the catalyst, the adhesion or mold release improver, and the additives such as antioxidants, bluing agents, ultraviolet absorbers, and property improving additives may be all blended simultaneously in the same container under stirring, or may be blended by adding each component stepwise. Alternatively, a few of the components are separately blended and then blended together in the same container. The order of the blending is not particularly limited.

The mixing temperature and time are not critical as far as the components are sufficiently mixed. An excessively high temperature and an excessively long mixing time unfavorably make the casting operation difficult because undesirable reaction between the starting materials and additives is induced to increase the viscosity. The mixing temperature is about −50 to 100° C., preferably −30 to 70° C., more preferably −5 to 50° C. The mixing time is one minute to 12 h, preferably five minutes to 10 h, and more preferably 5 min to 6 h. The degasification under reduced pressure prior to the mixing, during the mixing or after the mixing of the starting materials and additives is preferred to prevent the generation of bubbles during the subsequent casting step and curing step by polymerization. The degree of evacuation is about 0.1 to 700 mmHg, preferably 0.5 to 300 mmHg. To increase the quality of the optical material of the invention, it is preferred to remove impurities by filtering the starting materials before or after mixing through a filter having a pore size of about 0.05 to 3 μm. After casting the starting mixture into a glass or meal mold, the curing by polymerization is conducted using an electric furnace, a water bath or an oil bath. The curing time is 0.1 to 100 h, preferably 1 to 72 h. The curing temperature is −10 to 160° C., preferably 0 to 140° C. The polymerization is carried out by keeping the starting mixture at a given polymerization temperature for a given period of time while raising the temperature at 0.1 to 100° C./h, lowering the temperature at 0.1 to 100° C./h or using a combination thereof. After curing, it is preferred to anneal the optical material at 50 to 150° C. for 10 min to 5 h because the strain of the optical material can be removed. The optical material may be further subjected to surface treatment for improving dyeability, providing hard coating, and imparting non-reflection or non-fogging properties and impact resistance.

The optical material produced by polymerization-curing the composition of the present invention has a refractive index of 1.70 to 1.80, and Abbe's number of 31 to 36 for a refractive index of 1.60, 30 to 33 for a refractive index of 1.75, and 28 to 30 for a refractive index of 1.80.

The present invention will be described in more detail by reference to the following examples which should not be construed to limit the scope of the invention thereto. The lens was evaluated by the following methods.

Refractive Index (nD) and Abbe's Number (vD):
Measured at 25° C. using Abbe refractometer.

SYNTHESIS EXAMPLE 1

Into a reaction flask equipped with a thermometer and a calcium chloride drying tube, were quickly charged 1000 mL of acetic acid, 430 g (3.15 mol) of zinc chloride, 204.2 g (2.00 mol) of acetic anhydride, 228.4 g (3.00 mol) of thioacetic acid, 46.0 g (1.00 mol) of formic acid in this order, and then vigorously stirred. When the temperature was raised to 50° C., the flask was immersed into a thermostatic vessel maintained at 50° C. to allow the reaction to proceed for 2 h at this temperature. After the reaction, the reaction product solution was poured into a beaker containing 200 mL of concentrated hydrochloric acid and 2000 mL of iced water, and the mixture was extracted with 1500 mL of chloroform. The extract was sequentially washed with 1000 mL of water, 1000 mL of 1M aqueous solution of sodium carbonate, and 1000 mL of water. After distilling off chloroform, an orange viscous suspension was obtained as a reaction product, which was then recrystallized from carbon disulfide to obtain 91.0 g of methanetrithiol triacetate as a slightly lachrymatory yellowish solid.

A reaction flask equipped with a thermometer was immersed in a water bath, into which 800 mL of methanol, 187.2 g (0.79 mol) of methanetrithiol triacetate, and 800 mL of concentrated hydrochloric acid were charged in this order. The mixture was vigorously stirred to allow the reaction to proceed for 5 h while maintaining the reaction liquid at 30° C. After the reaction, the disappearance of methanetrithiol triacetate in the reaction liquid was confirmed by $^1$H-NMR. Then the reaction liquid was poured into 800 mL of iced water in a beaker, and extracted with three portions of 640 mL chloroform. The extract was washed with 1920 mL of water and dried over sodium sulfate. The obtained chloroform solution of methanetrithiol was a yellowish transparent liquid, and used in the next reaction without further purification.

A reaction flask equipped with a thermometer and a calcium chloride drying tube was immersed in a water bath of 25° C., into which the chloroform solution of methanetrithiol and 76.0 g (0.96 mol) of pyridine. The mixture was vigorously stirred and allowed to react for 1.5 h at 25° C. After the reaction, the reaction solution was poured into a beaker containing 320 mL of concentrated hydrochloric acid and 1600 mL of iced water. The chloroform suspension was separated and washed with 1920 mL of water. After filtration, chloroform was distilled off. The obtained reaction product was a yellowish viscous suspension, which was recrystallized from carbon disulfide to obtain 4.8 g of 2,4,6-trimercapto-1,3,5-trithiane as a white solid.

EXAMPLE 1

Dicumyl peroxide (0.3 part by weight) as a catalyst was mixed with a 100 parts by weight of mixture consisting of 55 parts by weight of 2,4,6-trimercapto-1,3,5-trithiane and 45 parts by weight of divinylbenzene to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 2

Triethylamine (0.2 part by weight) as a catalyst was mixed with a 100 parts by weight of mixture consisting of 43 parts by weight of 2,4,6-trimercapto-1,3,5-trithiane and 57 parts by weight of 1,2-bis(β-epoxypropylthio)ethane to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 3

Dibutyltin dilaurate (0.2 part by weight) as a catalyst was mixed with a 100 parts by weight of mixture consisting of 50 parts by weight of 2,4,6-trimercapto-1,3,5-trithiane and 50 parts by weight of m-xylylene diisocyanate to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 4

The procedure of Example 3 was repeated except for changing the chemical composition of the mixture as shown in Table 1. The refractive index and the Abbe's number of the obtained lens are shown in Table 1.

EXAMPLE 5

Tetrabutylammonium bromide (0.05 part by weight) as a catalyst was mixed with a 100 parts by weight of mixture consisting of 30 parts by weight of 2,4,6-trimercapto-1,3,5-trithiane and 70 parts by weight of bis(β-epithiopropyl) sulfide to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLES 6–7

The procedure of Example 5 was repeated except for changing the chemical composition of the mixture as shown in Table 1. The refractive index and the Abbe's number of the obtained lens are shown in Table 1.

EXAMPLE 8

In nitrogen atmosphere, 60 parts by weight of bis(β-epithiopropyl) sulfide and 20 parts by weight of elemental sulfur were mixed udder stirring at 100° C. for one hour. After cooling to 40° C., 20 parts by weight of 2,4,6-trimercapto-1,3,5-trithiane was added. The resultant 100 parts by weight of mixture was mixed with a mixed catalyst consisting of 1.0 part by weight of triphenylphosphine and 0.005 part by weight of cetyldimethylammonium chloride to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 9

Tetrabutylammonium bromide (0.1 part by weight) and dibutyltin dilaurate (0.2 part by weight) as catalysts were mixed with 100 parts by weight of mixture consisting of 25 parts by weight of 2,4,6-trimercapto-1,3,5-trithiane, 65 parts by weight of bis(β-epithiopropyl) sulfide and 10 parts by weight of m-xylylene diisocyanate to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 10

In nitrogen atmosphere, 60 parts by weight of bis(β-epithiopropyl) sulfide and 10 parts by weight of elemental sulfur were mixed udder stirring at 50° C. for one hour. After cooling to room temperature, 20 parts by weight of 2,4,6-trimercapto-1,3,5-trithiane and 10 parts by weight of m-xylylene diisocyanate were added. The resultant 100 parts by weight of mixture was mixed with a mixed catalyst consisting of 0.05 part by weight of tetrabutylammonium bromide and 0.05 part by weight of dibutyltin dilaurate to form a homogeneous liquid, which was then filtered through a 0.5 μm PTFE filter. The filtrate was cast into a mold for flat lens of 2.5 mm thick and cured by polymerization in an oven by raising the temperature from 10° C. to 120° C. over 22 h to prepare a lens. The prepared lens exhibited excellent heat resistance, physical properties, transparency and surface conditions. The refractive index and the Abbe's number of the obtained lens are shown in Table 1.

EXAMPLE 11

The procedure of Example 3 was repeated except for changing the chemical composition of the mixture as shown in Table 1. The refractive index and the Abbe's number of the obtained lens are shown in Table 1.

EXAMPLE 12

The procedure of Example 5 was repeated except for changing the chemical composition of the mixture as shown in Table 1. The refractive index and the Abbe's number of the obtained lens are shown in Table 1.

EXAMPLE 13

The procedure of Example 9 was repeated except for changing the chemical composition of the mixture as shown in Table 1. The refractive index and the Abbe's number of the obtained lens are shown in Table 1.

TABLE 1

| | Composition (part by weight) | refractive index | Abbe's number |
|---|---|---|---|
| Examples | | | |
| 1 | 2,4,6-trimercaptomethyl-1,3,5-trithiane/divinylbenzene = 55/45 | 1.71 | 30 |
| 2 | 2,4,6-trimercaptomethyl-1,3,5-trithiane/1,2-bis(β-epoxypropylthio)ethane = 43/57 | 1.70 | 36 |
| 3 | 2,4,6-trimercapto-1,3,5-trithiane/m-xylylene diisocyanate = 50/50 | 1.71 | 30 |
| 4 | 2,4,6-trimercapto-1,3,5-trithiane/2,5-bis(isocyanatomethyl)-1,4-dithiane = 50/50 | 1.74 | 30 |
| 5 | 2,4,6-trimercapto-1,3,5-trithiane/bis(β-epithiopropyl) sulfide = 30/70 | 1.74 | 32 |
| 6 | 2,4,6-trimercapto-1,3,5-trithiane/bis(β-epithiopropyl) disulfide = 25/75 | 1.76 | 31 |
| 7 | 2,4,6-trimercapto-1,3,5-trithiane/bis(β-epithiopropyl) selenide = 20/80 | 1.75 | 32 |
| 8 | 2,4,6-trimercapto-1,3,5-trithiane/bis(β-epithiopropyl) sulfide/sulfur = 20/60/20 | 1.77 | 30 |
| 9 | 2,4,6-trimercapto-1,3,5-trithiane/bis(β-epithiopropyl) sulfide/m-xylylene diisocyanate = 25/65/10 | 1.72 | 34 |
| 10 | 2,4,6-trimercapto-1,3,5-trithiane/bis(β-epitbiopropyl) sulfide/m-xylylene diisocyanate/sulfur = 20/60/10/10 | 1.73 | 33 |
| 11 | 2,4,6-trimercaptomethyl-1,3,5-trithiane/m-xylylene diisocyanate = 55/45 | 1.70 | 31 |
| 12 | 2,4,6-trimercaptomethyl-1,3,5-trithiane/bis(β-epithiopropyl) sulfide = 30/70 | 1.73 | 34 |
| 13 | 2,4,6-trimercaptomethyl-1,3,5-trithiane/bis(β-epithiopropyl) sulfide/m-xylylene diisocyanate = 26/65/10 | 1.71 | 35 |

COMPARATIVE EXAMPLE 1

The procedure of Example 1 was repeated except for changing the chemical composition of the mixture as shown in Table 2. The surface of the lens was covered with cracks. The refractive index and the Abbe's number of the obtained lens are shown in Table 2.

COMPARATIVE EXAMPLE 2

The procedure of Example 2 was repeated except for changing the chemical composition of the mixture as shown in Table 2. The obtained lens was soft.

COMPARATIVE EXAMPLES 3–4

The procedure of Example 3 was repeated except for changing the chemical composition of the mixture as shown in Table 2. The polymerization did not proceed with this composition and lens was not obtained.

COMPARATIVE EXAMPLE 5

The procedure of Example 4 was repeated except for changing the chemical composition of the mixture as shown in Table 2. The refractive index and the Abbe's number of the obtained lens are shown in Table 2.

COMPARATIVE EXAMPLES 6–8

The procedure of Example 5 was repeated except for changing the chemical composition of the mixture as shown in Table 2. The refractive index and the Abbe's number of the obtained lens are shown in Table 2.

COMPARATIVE EXAMPLE 9

The procedure of Example 8 was repeated except for changing the chemical composition of the mixture as shown in Table 2. The refractive index and the Abbe's number of the obtained lens are shown in Table 2.

COMPARATIVE EXAMPLE 10

The procedure of Example 9 was repeated except for changing the chemical composition of the mixture as shown in Table 2. The obtained lens was soft and poor in the releasability.

COMPARATIVE EXAMPLE 11

The procedure of Example 10 was repeated except for changing the chemical composition of the mixture as shown in Table 2. The obtained lens was soft and poor in the releasability.

TABLE 2

| Composition (part by weight) | refractive index | Abbe's number |
|---|---|---|
| Comparative Examples | | |
| 1 divinylbenzene = 100 | 1.62 | 29 |
| 2 1,2-bis(β-epoxypropylthio)ethane = 100 | lens was soft | |
| 3 m-xylylene diisocyanate = 100 | no polymerization | |
| 4 2,5-bis(isocyanatomethyl)-1,4-dithiane = 100 | no polymerization | |
| 5 1,8-dimercapto-4-mercaptomethyl-3,6-dithiaoctane/m-xylylene diisocyanate = 48/52 | 1.66 | 32 |
| 6 bis(β-epithiopropyl) sulfide = 100 | 1.70 | 36 |
| 7 bis(β-epithiopropyl) disulfide = 100 | 1.73 | 33 |
| 8 bis(β-epithiopropyl) selenide = 100 | 1.73 | 33 |
| 9 bis(β-epithiopropyl) sulfide/sulfur = 60/20 | 1.76 | 31 |
| 10 bis(β-epithiopropyl) sulfide/m-xylylene diisocyanate = 65/10 | lens was soft | |
| 11 bis(β-epithiopropyl) sulfide/m-xylylene diisocyanate/sulfur = 60/10/10 | lens was soft | |

INDUSTRIAL APPLICABILITY

By polymerization-curing a composition for optical materials containing the compound of Formula 1, optical materials having higher refractive index can be obtained.

The invention claimed is:

1. A composition for optical materials comprising at least one compound represented by the following Formula 1:

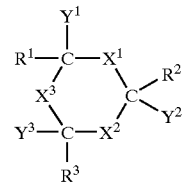

(1)

wherein $R^1$, $R^2$ and $R^3$ are each independently $C_1$–$C_{10}$ hydrocarbyl or hydrogen;

$X^1$, $X^2$ and $X^3$ are each independently S, Se or Te; $Y^1$, $Y^2$ and $Y^3$ are each independently —$S_a$—[$(CH_2)_b S]_c$H, a is an integer from 0 to 2, b is an integer from 0 to 4, and c is an integer from 0 to 2, and a compound reactive to the compound of Formula 1, wherein the compound reactive to the compound of Formula 1 is a sulfur-containing organic compound, an isocyanate compound, an isothiocyanate compound, an epoxy compound or a vinyl compound, and wherein the sulfur-containing organic compound has, in one molecule, at least one group represented by the following Formula 2:

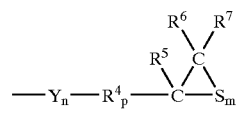

(2)

wherein $R^4$ is $C_1$–$C_{10}$ hydrocarbyl; $R^5$, $R^6$ and $R^7$ are each independently $C_1$–$C_{10}$ hydrocarbyl or hydrogen; Y is O, S, Se or Te; m is an integer from 1 to 5; n is an integer from 0 to 5; and p is 0 or 1.

2. The composition for optical materials according to claim 1, wherein 100 parts by weight of the composition contains 1 to 99 parts by weight of the compound of Formula 1 and 1 to 99 parts by weight of the compound reactive to the compound of Formula 1.

3. The composition for optical materials according to claim 1 or 2, wherein $X^1$, $X^2$ and $X^3$ are each independently S or Se.

4. The composition for optical materials according to claim 1 or 2, wherein $X^1$, $X^2$ and $X^3$ are S.

5. The composition for optical materials according to claim 1, wherein $X^1$, $X^2$ and $X^3$ are each independently S or Se.

6. The composition for optical materials according to claim 1, wherein $X^1$, $X^2$ and $X^3$ are S.

7. A method for producing an optical material, which comprises a step of curing the composition for optical materials as defined in claim 1 by polymerization.

8. An optical material produced by the method according to claim 7.

9. An optical lens comprising the optical material according to claim 8.

10. The composition for optical materials according to claim 1, wherein the isocyanate compound is a polyisocyanate or a sulfur-containing polyisocyanate.

11. The composition for optical materials according to claim 10, wherein said compound reactive to said compound of Formula 1includes said polyisocyanate or said sulfur-containing polyisocyanate.

12. The composition for optical materials according to claim 1, wherein said epoxy compound is a sulfur-containing epoxy compound.

13. The composition for optical materials according to claim 12, wherein said compound reactive to said compound of Formula 1includes said sulfur-containing epoxy compound.

14. The composition for optical materials according to claim 1, wherein said vinyl compound is divinylbenzene or trivinylbenzene.

15. The composition for optical materials according to claim 14, wherein said compound reactive to said compound of Formula 1includes divinylbenzene or trivinylbenzene.

* * * * *